(12) United States Patent
Kurihara et al.

(10) Patent No.: US 9,336,052 B2
(45) Date of Patent: May 10, 2016

(54) PROGRAM EXECUTING METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Kawasaki (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 13/956,710

(22) Filed: Aug. 1, 2013

(65) Prior Publication Data

US 2013/0318375 A1 Nov. 28, 2013

Related U.S. Application Data

(63) Continuation of application No. PCT/JP2011/052064, filed on Feb. 1, 2011.

(51) Int. Cl.
*G06F 9/48* (2006.01)
*G06F 1/32* (2006.01)
*G06F 9/455* (2006.01)
*G06F 9/45* (2006.01)
*G06F 9/44* (2006.01)

(52) U.S. Cl.
CPC ............ *G06F 9/4893* (2013.01); *G06F 1/3203* (2013.01); *G06F 1/3234* (2013.01); *G06F 8/4432* (2013.01); *G06F 1/324* (2013.01); *G06F 8/31* (2013.01); *G06F 8/41* (2013.01); *G06F 9/45504* (2013.01); *Y02B 60/181* (2013.01)

(58) Field of Classification Search
CPC ......... G06F 1/324; G06F 1/3234; G06F 8/41; G06F 8/31; G06F 8/37; G06F 8/48; G06F 9/45504
USPC ................... 713/320, 322; 717/140, 146, 147
See application file for complete search history.

(56) References Cited

U.S. PATENT DOCUMENTS

| | | | |
|---|---|---|---|
| 6,205,555 B1 * | 3/2001 | Kageshima et al. | 713/300 |
| 2004/0210865 A1 | 10/2004 | Shimura | |
| 2006/0101426 A1 * | 5/2006 | Ioku et al. | 717/136 |

(Continued)

FOREIGN PATENT DOCUMENTS

| | | |
|---|---|---|
| JP | 2001-195264 | 7/2001 |
| JP | 2003-140909 A | 5/2003 |
| JP | 2004-355277 | 12/2004 |

(Continued)

OTHER PUBLICATIONS

International Preliminary Report on Patentability issued on Aug. 15, 2013 in corresponding International Patent Application No. PCT/JP2011/052064.

(Continued)

*Primary Examiner* — Ji H Bae

(74) *Attorney, Agent, or Firm* — Staas & Halsey LLP

(57) ABSTRACT

A program executing method is executed by a computer and includes calculating a first power consumption for execution of a first program described by first code; calculating a second power consumption for execution of a second program of a function identical to that of the first program and described by second code; and converting the first program into the second program and executing the second program, if the second power consumption is less than the first power consumption.

9 Claims, 16 Drawing Sheets

(56) References Cited

U.S. PATENT DOCUMENTS

2007/0226714 A1 9/2007 Doi
2008/0034236 A1* 2/2008 Takayama et al. ............ 713/322

FOREIGN PATENT DOCUMENTS

| JP | 2006-126947 | 5/2006 |
| JP | 2007-141153 | 6/2007 |
| JP | 2009-151375 | 7/2009 |

OTHER PUBLICATIONS

International Search Report mailed Mar. 15, 2011 in corresponding International Application No. PCT/JP2011/052064.

* cited by examiner

FIG.4

| CPU IDENTIFICATION INFORMATION (401) | APPLICATION IDENTIFICATION INFORMATION (402) |
|---|---|
| CPU #0 | - |
| CPU #1 | - |

| EXECUTION (501) | CLOCK FREQUENCY (502) | POWER CONSUMPTION PER UNIT TIME (503) |
|---|---|---|
| EXECUTION IN NATIVE CODE | 100 [MHz] | 25 [mW] |
| EXECUTION IN BYTECODE | 200 [MHz] | 50 [mW] |
| EXECUTION OF COMPILER | 300 [MHz] | 100 [mW] |

| APPLICATION IDENTIFICATION INFORMATION (601) | CONVERSION STATE (602) |
|---|---|
| - | - |

| APPLICATION IDENTIFICATION INFORMATION | CONVERSION STATE |
|---|---|
| APPLICATION #A | NOT COMPLETED |

FIG.10

| CPU IDENTIFICATION INFORMATION | APPLICATION IDENTIFICATION INFORMATION |
|---|---|
| CPU #0 | JavaVM: APPLICATION #A |
| CPU #1 | COMPILER |

FIG.12

| APPLICATION IDENTIFICATION INFORMATION 601 | CONVERSION STATE 602 | 600 |
|---|---|---|
| APPLICATION #A | COMPLETED | |

FIG.13

| CPU IDENTIFICATION INFORMATION 401 | APPLICATION IDENTIFICATION INFORMATION 402 | 400 |
|---|---|---|
| CPU #0 | APPLICATION #A | |
| CPU #1 | - | |

FIG.18

| EXECUTION | CLOCK FREQUENCY | PROPORTION |
|---|---|---|
| EXECUTION IN NATIVE CODE | 100 [MHz] | 1/2 |
| EXECUTION IN BYTECODE | 200 [MHz] | 1 |
| EXECUTION OF COMPILER | 300 [MHz] | 2 |

PROGRAM EXECUTING METHOD

CROSS REFERENCE TO RELATED APPLICATIONS

This application is a continuation application of International Application PCT/JP2011/052064, filed on Feb. 1, 2011 and designating the U.S., the entire contents of which are incorporated herein by reference.

FIELD

The embodiments discussed herein is related to a program executing method.

BACKGROUND

When distributed processing is conventionally executed by using grid computers, etc., individual machines have configurations different from each other and, therefore, the Java (registered trademark) bytecode (hereinafter referred to as "bytecode") of an application is distributed to each machine. Each machine uses a Java virtual machine (hereinafter referred to as "Java Virtual Machine (VM)") to execute the application in the bytecode.

Bytecode is executable code generated by a Java compiler. Bytecode is a type of intermediate code and is not dependent on a particular execution environment. Bytecode is converted by an interpreter in the Java VM into native code before execution (see, e.g., Japanese Laid-Open Patent Publication No. 2004-355277). For example, the Java VM includes a just-in-time (JIT) compiler (see, e.g., Japanese Laid-Open Patent Publication No. 2001-195264 and Japanese Patent Publication No. 3808755). Native code is a program written in a machine language specific to a machine.

A mobile terminal conventionally downloads an application in the bytecode and uses a Java VM to execute the application in the bytecode.

In a known technique, the execution priority of source code written in Java by a designer to the bytecode after compilation into an intermediate language is determined depending on power requirements so as to reduce power consumption (see, for example, Japanese Laid-Open Patent Publication No. 2006-126947).

If multiple applications are assigned, a central processing unit (CPU) determines the priority of execution, based on the execution time of each application. In a known technique, when leftover (available) time arises with the execution of an application, another application is executed during the available time, according to priority (see, for example, Japanese Laid-Open Patent Publication No. 2009-151375).

When terminals differ in performance as in the case of mobile terminals, although power consumption can be reduced by using conventional technologies, if all the terminals are subject to the same conditions in terms of power requirements, it is problematic that the actual performance of individual terminals cannot be fully realized.

SUMMARY

According to an aspect of an embodiment, a program executing method is executed by a computer and includes calculating a first power consumption for execution of a first program described by first code; calculating a second power consumption for execution of a second program of a function identical to that of the first program and described by second code; and converting the first program into the second program and executing the second program, if the second power consumption is less than the first power consumption.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of an assignment management table;
FIG. 5 is an explanatory view of an example of a power consumption table used in a first example;
FIG. 6 is an explanatory view of an example of a conversion management table;
FIG. 8 is an explanatory view of a registration example of a conversion management table 600;
FIG. 10 is an explanatory view of an update example of an assignment management table 400 according to an assignment of a compiler 900 and an application #A;
FIG. 12 is an explanatory view of an update example of the conversion management table 600 after completion of conversion;
FIG. 13 is an explanatory view of an update example of the assignment management table 400 after completion of conversion;
FIG. 18 is an explanatory view of an example of a power consumption table used in the second example.

DESCRIPTION OF EMBODIMENTS

Embodiments of a program executing method will be described in detail with reference to the accompanying drawings. In the present embodiment, a first program described by first code is referred to as bytecode of a given application. A second program having the same function as the first program and described by second code is referred to as a native code of the given application.

Figure 1:
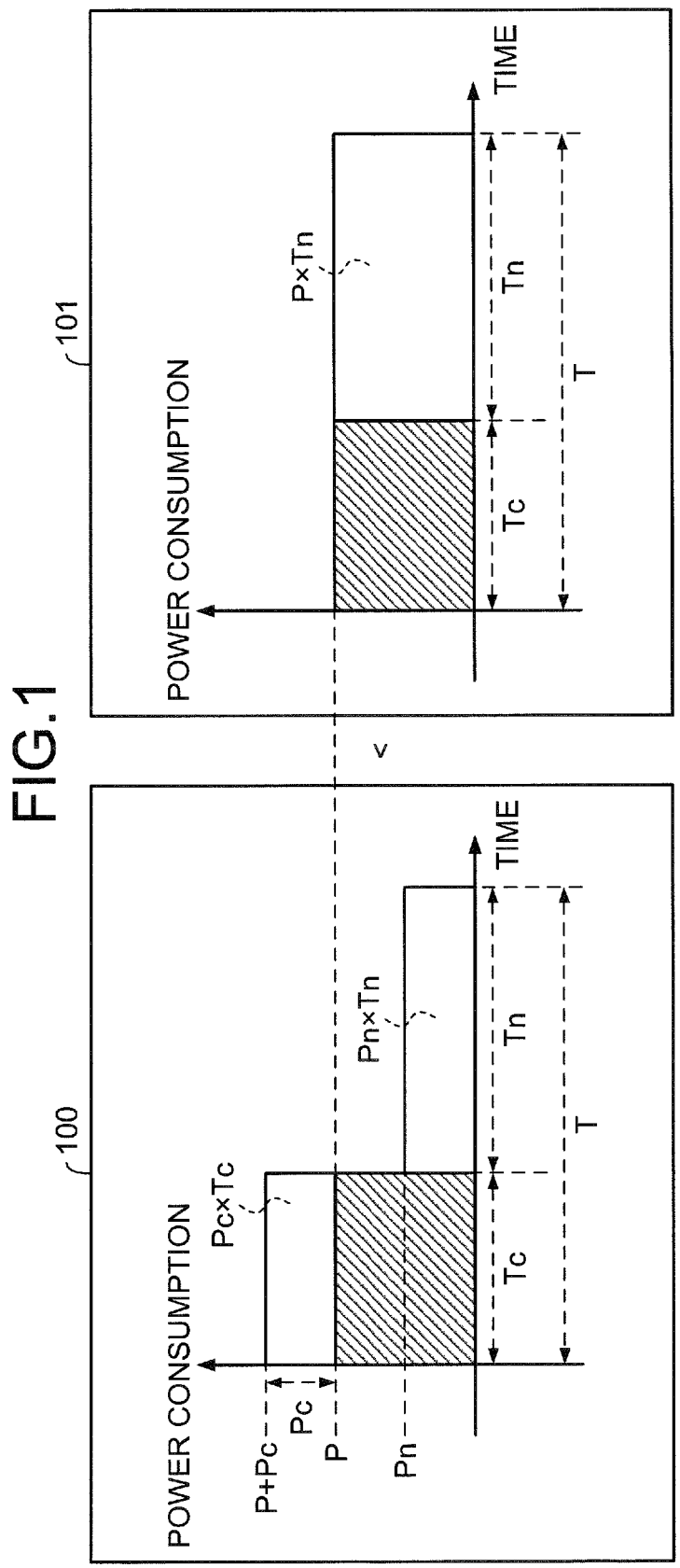
FIG. 1 is an explanatory view of an example of an embodiment.

FIG. 1 is an explanatory view of an example of the embodiment. In this example, it is determined whether power consumption becomes lower when a program executing apparatus executes an application in the bytecode while converting the bytecode into the native code and then executes the application in the native code after completion of the conversion, or when the program executing apparatus executes the application in the bytecode. The program executing apparatus determines whether the bytecode is to be converted into the native code, based on the determination result. A graph 100 represents power consumption when the application is executed in the bytecode while the bytecode is being converted into the native code and then after completion of the conversion, the application is executed in the native code. A graph 101 represents power consumption when the application is executed in the bytecode The program executing apparatus downloads a given application. Information related to the given application includes the bytecode, a bytecode execution time (T), and the amount of code (Code) of the bytecode. The bytecode execution time (T) of the given application indicates execution performance required during execution in the bytecode. In FIG. 1, it is determined whether a value of power consumption decreases if the application is executed in the native code with the same performance as that during execution in the bytecode. The program executing apparatus uses a code amount to calculate a conversion time (Tc) required for conversion from the bytecode of the given application into the native code of the given application. Tc is calculated based on Equation (1):

$$Tc \approx k \times Code + C \quad (1)$$

Where, k is a proportionality coefficient determined according to CPU performance and compiler performance, and C is a constant dependent on CPU performance and compiler performance. The program executing apparatus calculates the execution time (Tn) required for executing the given application in the native code after the conversion from the bytecode into the native code, based on Equation (2).

$$Tn = T - Tc \quad (2)$$

The program executing apparatus determines that the bytecode of the given application is to be converted into the native code if Expression (3) is satisfied. The program executing apparatus determines that the bytecode of the given application is not to be converted into the native code if Expression (3) is not satisfied.

$$Pc \times Tc + Pn \times Tn < P \times Tn \quad (3)$$

Pc is a value of power consumption per unit time for conversion from the bytecode into the native code; Pn is a value of power consumption per unit time for execution in the native code; and P is a value of power consumption per unit time for execution in the bytecode. Pn<P<Pc is satisfied. The execution in the bytecode requires execution of a Java VM and consequently, the execution in the bytecode has a greater value of power consumption per unit time than the execution in the native code.

Pn, P, and Pc are determined in advance according to the CPU performance of each terminal. The CPU performance in this case includes, for example, calculation capability and the frequency of the clock supplied during each execution. Since P×Tc (shaded portion) is common in the graph 100 and the graph 101, P×Tc is not included in Expression (3).

In the embodiment, power consumption is calculated based on the execution time of the given application. Since a game with a predictable execution time such as a fortune-telling application, advertisement on a banner, etc., has a constant execution time, the program executing apparatus can download the execution time along with the bytecode as described above. The execution time of an application may be embedded in Hyper Text Markup Language (HTML) by a developer of the application. The program executing apparatus may predict the execution time of the given application from statistical data of the execution time of the given application.

Although the program executing apparatus may be a single core system or a multicore processor system, the embodiment will be described by taking a multicore processor system as an example. In the multicore processor system, a multicore processor is a processor equipped with multiple cores. As long as multiple cores are provided, the multicore processor may be a single processor equipped with multiple cores or a group of single-core processors arranged in parallel. In this embodiment, a group of single-core processors arranged in parallel is taken as an example for simplicity of description.

Figure 2:
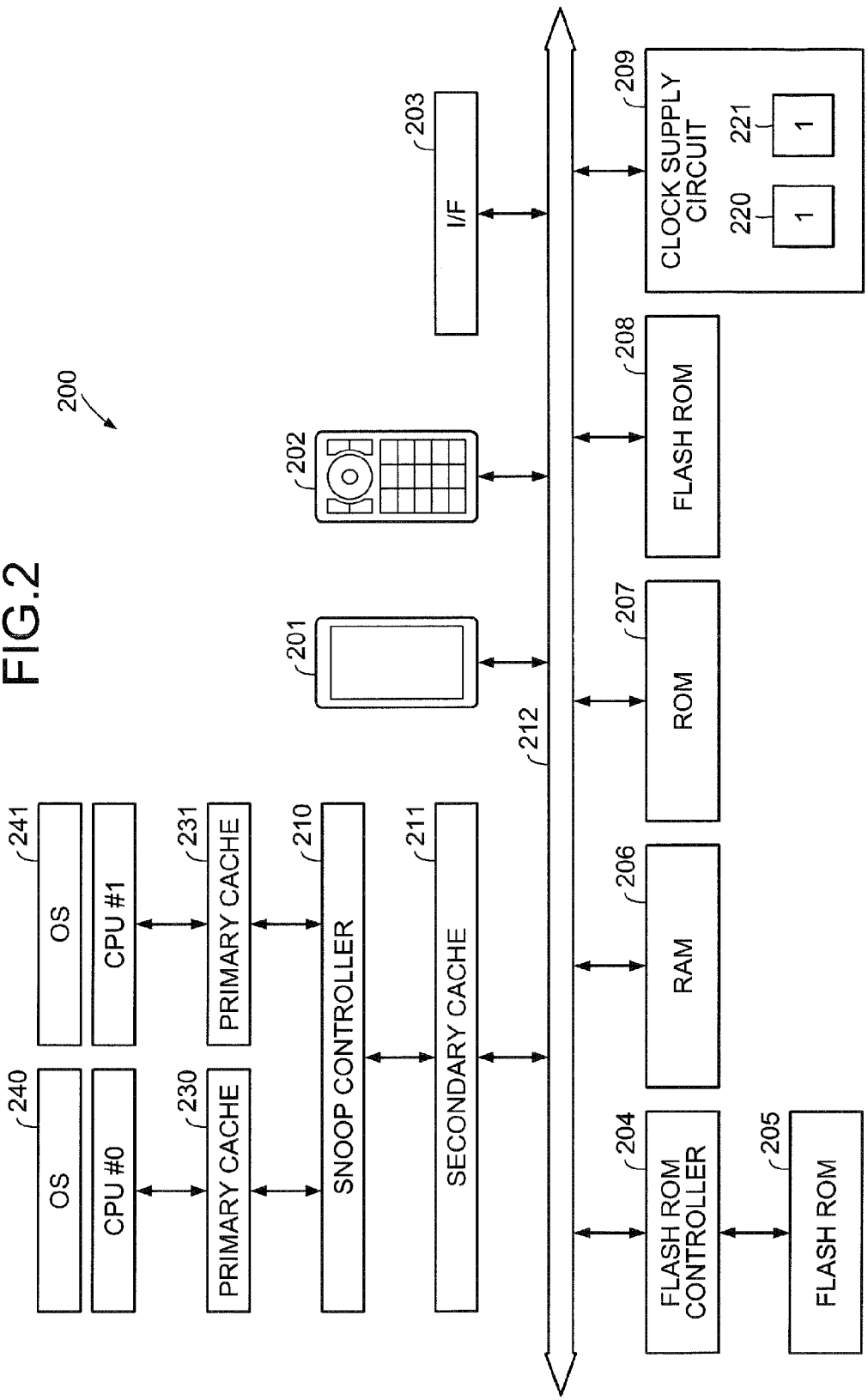
FIG. 2 is an explanatory view of hardware of a multicore processor system.

FIG. 2 is an explanatory view of hardware of a multicore processor system. In FIG. 2, a multicore processor system 200 has a CPU #0, a CPU #1, a display 201, a keyboard 202, an interface (I/F) 203, and a random access memory (RAM) 206. The multicore processor system 200 also has a flash read only memory (ROM) controller 204, flash ROM 205, ROM 207, flash ROM 208, and a clock supply circuit 209. The CPU #0, the CPU #1, the display 201, the keyboard 202, the I/F 203, the flash ROM controller 204, the RAM 206, the ROM 207, and the flash ROM 208 are connected via a bus 212.

Each of the CPUs #0 and #1 has a register and a core. The core has a computing function. The register in each of the CPUs has a program counter (PC) and a reset register.

The CPU #0 is a master CPU responsible for the overall control of the multicore processor system 200 and executes an OS 240. The OS 240 is a master OS and executes applications assigned to the CPU #0. The OS 240 has a scheduler, which has a function of controlling to which CPU in the multicore processor, an application for which an activation instruction has been received is assigned. The scheduler has a function of controlling the order of execution of applications assigned to the CPU #0.

The CPU #1 is a slave CPU and executes an OS 241. The OS 241 is a slave OS and executes applications assigned to the CPU #1. The OS 241 has a scheduler, which has a function of controlling the order of execution of applications assigned to the CPU #1.

Each primary cache 230 and 231 has cache memory and a cache controller. The primary cache 230 temporarily stores writing to the RAM 206 from a thread of an application executed by the OS 240. The primary cache 230 temporarily stores data read from the RAM 206. The primary cache 231 temporarily stores writing to the RAM 206 from a thread of an application executed by the OS 241. The primary cache 231 temporarily stores data read from the RAM 206.

When data shared by the primary cache 230 and the primary cache 231 is updated in one of the caches, a snoop controller 210 has a function of detecting the update and updating the data in the other primary cache.

A secondary cache 211 has cache memory and a cache controller. The secondary cache 211 stores data purged from the primary cache 230 and the primary cache 231. The secondary cache 211 stores data shared by the OS 240 and the OS 241. The secondary cache 211 has a larger storage capacity and a slower access speed from the CPUs as compared to the primary cache 230 and the primary cache 231. The secondary cache 211 has a smaller storage capacity and a faster access speed from the CPUs as compared to the RAM 206.

The display 201 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 201. The keyboard 202 includes, for example, keys for inputting letters, numerals, and various instructions and performs the input of data. Alternatively, a touch-panel-type input pad or numeric keypad, etc. may be adopted.

The I/F 203 is connected to a network such as a local area network (LAN), a wide area network (WAN), and the Internet through a communication line and is connected to other apparatuses through the network 514. The I/F 203 administers an internal interface with the network and controls the input/output of data from/to external apparatuses. For example, a modem or a LAN adaptor may be employed as the I/F 203. In the present embodiment, an application is downloaded to the flash ROM 208 via the I/F.

The flash ROM controller 204, the flash ROM 205, the RAM 206, the ROM 207, and the flash ROM 208 are memory devices shared by the CPU #0 and the CPU #1. Although not depicted, a memory controller arbitrates access requests from the CPUs to the memory.

The ROM 207 stores programs such as a boot program. The RAM 206 is used as a work area of the CPUs. The flash ROM 208 stores system software such as the OS 240 and the OS 241, the bytecode of applications, and the native code of applications.

The flash ROM controller 204 controls the reading and writing of data to a flash ROM under the control of the CPUs. The flash ROM 205 stores data written thereto under the control of the flash ROM controller 204. Examples of the data include image data and video data acquired through the I/F 203 by a user of the multicore processor system 200. For example, a memory card, an SD card, etc., may be adopted as the flash ROM 205.

The clock supply circuit 209 supplies a clock to components such as the CPUs. It is assumed that the clock supply circuit 209 can supply to the CPUs, clocks of frequencies of 100 [MHz], 200 [MHz], and 300 [MHz]. The clock supply circuit 209 has a register 220 and a register 221. The register 220 can set the frequency of the clock to be supplied to the CPU #0 and the register 221 can set the frequency of the clock to be supplied to the CPU #1.

If the value of the register 220 is one, the frequency of the clock supplied to the CPU #0 is set to 100 [MHz], and if the value of the register 220 is two, the frequency of the clock supplied to the CPU #0 is set to 200 [MHz]. If the value of the register 220 is three, the frequency of the clock supplied to the CPU #0 is set to 300 [MHz]. If the value of the register 221 is one, the frequency of the clock supplied to the CPU #1 is set to 100 [MHz], and if the value of the register 221 is two, the frequency of the clock supplied to the CPU #1 is set to 200 [MHz]. If the value of the register 221 is three, the frequency of the clock supplied to the CPU #1 is set to 300 [MHz].

Figure 3:
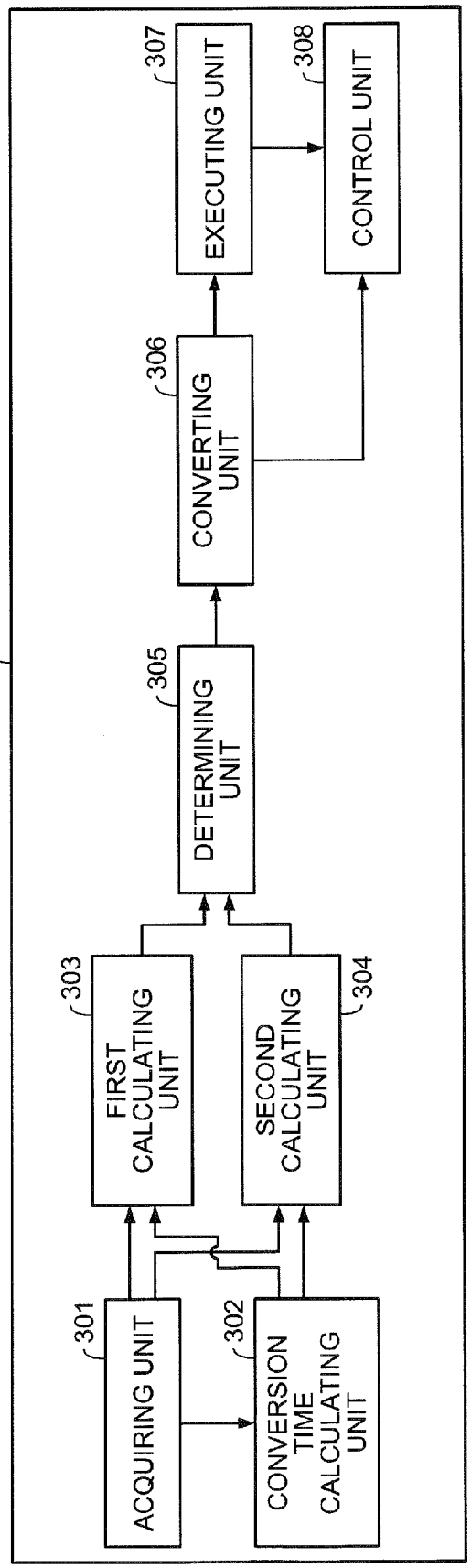
FIG. 3 is a functional block diagram of a multicore processor system 200.

FIG. 3 is a functional block diagram of the multicore processor system 200. The multicore processor system 200 includes an acquiring unit 301, a conversion time calculating unit 302, a first calculating unit 303, a second calculating unit 304, a determining unit 305, a converting unit 306, an executing unit 307, and a control unit 308. For example, a storage device such as the flash ROM 208 stores programs for processes related to the acquiring unit 301 to the control unit 308. Processes related to the acquiring unit 301 to the control unit 308 are implemented by executing on a CPU in the multicore processor, the programs stored in the storage device. In the present embodiment, the programs include the OS 240, the OS 241, and a compile scheduler described later.

The acquiring unit 301 acquires the conversion time (Tc) required for conversion of the given application from the bytecode, which is not a machine language, into the native code, which is a machine language, and the bytecode execution time (T). The conversion time (Tc) may be acquired or calculated. If the conversion time (Tc) is calculated, the acquiring unit 301 acquires the amount of code of the bytecode. The conversion time calculating unit 302 calculates the conversion time (Tc) according to the amount of code of the bytecode and the CPU performance. For example, the conversion time calculating unit 302 performs a calculation based on Equation (2).

The first calculating unit 303 calculates a first power consumption for execution in bytecode. For example, the first calculating unit 303 calculates the difference (Tn) of the execution time (T) acquired by the acquiring unit 301 and the conversion time (Tc) calculated by the conversion time calculating unit 302. The first calculating unit 303 calculates a value (P×Tn) of power consumption for execution in the bytecode, based on the difference (Tn) and the value (P) of power consumption per unit time for execution in the bytecode. In this case, the value (P×Tn) of the power consumption for execution in the bytecode is the first power consumption.

The second calculating unit 304 calculates a second power consumption for execution in the native code. For example, the second calculating unit 304 calculates a value (Pc×Tc) of power consumption for the conversion time (Tc), based on the conversion time (Tc) calculated by the conversion time calculating unit 302 and the value (Pc) of power consumption per unit time for conversion.

The second calculating unit 304 calculates a value (Pn×Tn) of power consumption for execution in the native code, based on the difference (Tn) and the value (Pn) of power consumption per unit time for execution in the native code. The second calculating unit 304 calculates the sum of the value of power consumption for the conversion time calculated by the first calculating unit 303 and the value of power consumption for execution in the native code calculated by the second calculating unit 304. In this case, the sum is the second power consumption.

The second calculating unit 304 may calculate the second power consumption based on a proportion (Y) of the value (Pc) of power consumption per unit time for conversion to the value (P) of power consumption per unit time for execution in the bytecode. The second calculating unit 304 may calculate the second power consumption based on a proportion (X) of the value (Pn) of power consumption per unit time for execution in the native code to the value (P) of power consumption per unit time for execution in the byte code.

The determining unit 305 determines whether the sum calculated by the second calculating unit 304 is less than the value of power consumption for execution in the bytecode calculated by the first calculating unit 303.

If the determining unit 305 determines that the sum is less than the calculated value of power consumption for execution in the bytecode, the converting unit 306 converts the bytecode into the native code. If the determining unit 305 determines that the sum is not less than the calculated value of power consumption for execution in the bytecode, the converting unit 306 does not convert the bytecode into the native code.

If the determining unit 305 determines that the sum is less than the calculated value of power consumption for execution in the bytecode, the executing unit 307 executes the application in the bytecode until the converting unit 306 completes the conversion from the bytecode into the native code. When the converting unit 306 completes the conversion from the bytecode into the native code, the executing unit 307 executes the application in the native code. If the determining unit 305 determines that the sum is not less than the calculated value of power consumption for execution in the bytecode, the executing unit 307 executes the application in the byte code.

The control unit 308 sets the frequency of the operation clock for conversion of the bytecode into the native code by the converting unit 306 to be higher than the frequency of the operation clock set for execution in the bytecode. The control unit 308 sets the frequency of the clock for execution of the application in the native code to be lower than the frequency of the clock set for execution of the application in the bytecode.

Based on the above, description will be made in detail by using first and second examples. The first example represents an example of determining based on P, Pc, and Pn, whether the bytecode is to be converted into the native code. The second example represents an example of determining based on X and Y, whether the bytecode is to be converted into the native code.

FIG. 4 is an explanatory view of an example of an assignment management table. The assignment of applications to the respective CPUs is registered into the assignment management table 400. The assignment management table 400 has a CPU identification information field 401 and an application identification information field 402. The CPU identification information field 401 indicates CPU identification information. In this example, the identification information of the CPU #0 and the CPU #1 is registered.

The application identification information field 402 indicates the identification information of applications assigned to the CPU identified by the identification information registered in the CPU identification information field 401. The assignment management table 400 is assumed to be stored in a storage device such as the RAM 206, the primary cache 230 and the primary cache 231, and the secondary cache 211.

FIG. 5 is an explanatory view of an example of a power consumption table used in the first example. A power consumption table 500 has an execution field 501, a clock frequency field 502, and a field 503 of power consumption per unit time. The execution field 501 indicates execution in the native code, execution in the bytecode, and execution of a compiler. The clock frequency field 502 indicates the frequency of the clock supplied to the CPU corresponding to the execution registered in the execution field 501. The field 503 of power consumption per unit time indicates the power consumption per unit time for the execution registered in the execution field 501.

In the power consumption table 500, Pc is 100 [mW]; Pn is 25 [mW]; and P is 50 [mW] (Pn<P<Pc). In the power consumption table 500, a frequency (Cc) of the clock supplied to a CPU during execution of the compiler is 300 [MHz] and a frequency (Cn) of the clock supplied to a CPU during execution in the native code is 100 [MHz]. In the power consumption table 500, a frequency (Cb) of the clock supplied to a CPU during execution in the bytecode is 200 [MHz].

The relationship of Cn, Cb, and Cc satisfies Cn<Cb<Cc. Since the application is executed in the bytecode while the Java VM converts the bytecode into the native code, the execution in the bytecode has a larger processing volume as compared to the execution in the native code. Therefore, even if the clock frequency is lowered for execution in the native code as compared to the execution in the bytecode, the operation can be executed in the same time that the operation is executed in the bytecode. The power consumption table 500 is assumed to be stored in a storage device such as the RAM 206, the primary cache 230 and the primary cache 231, and the secondary cache 211.

FIG. 6 is an explanatory view of an example of a conversion management table. A conversion management table 600 manages conversion states of an application for which conversion from the bytecode into the native code has been determined. The conversion management table 600 has an application identification information field 601 and a conversion state field 602. The application identification information field 601 indicates identification information of an application for which conversion from the bytecode into the native code has been determined.

The conversion state field 602 indicates whether the bytecode of the application identified by the identification information registered in the application identification information field 601, has been converted into the native code. "COMPLETED" is registered in the conversion state field 602 for the application if conversion has been completed and "NOT COMPLETED" is registered in the conversion state field 602 for the application if conversion has not been completed. The conversion management table 600 is assumed to be stored in a storage device such as the RAM 206, the primary cache 230 and the primary cache 231, and the secondary cache 211.

Figure 7:
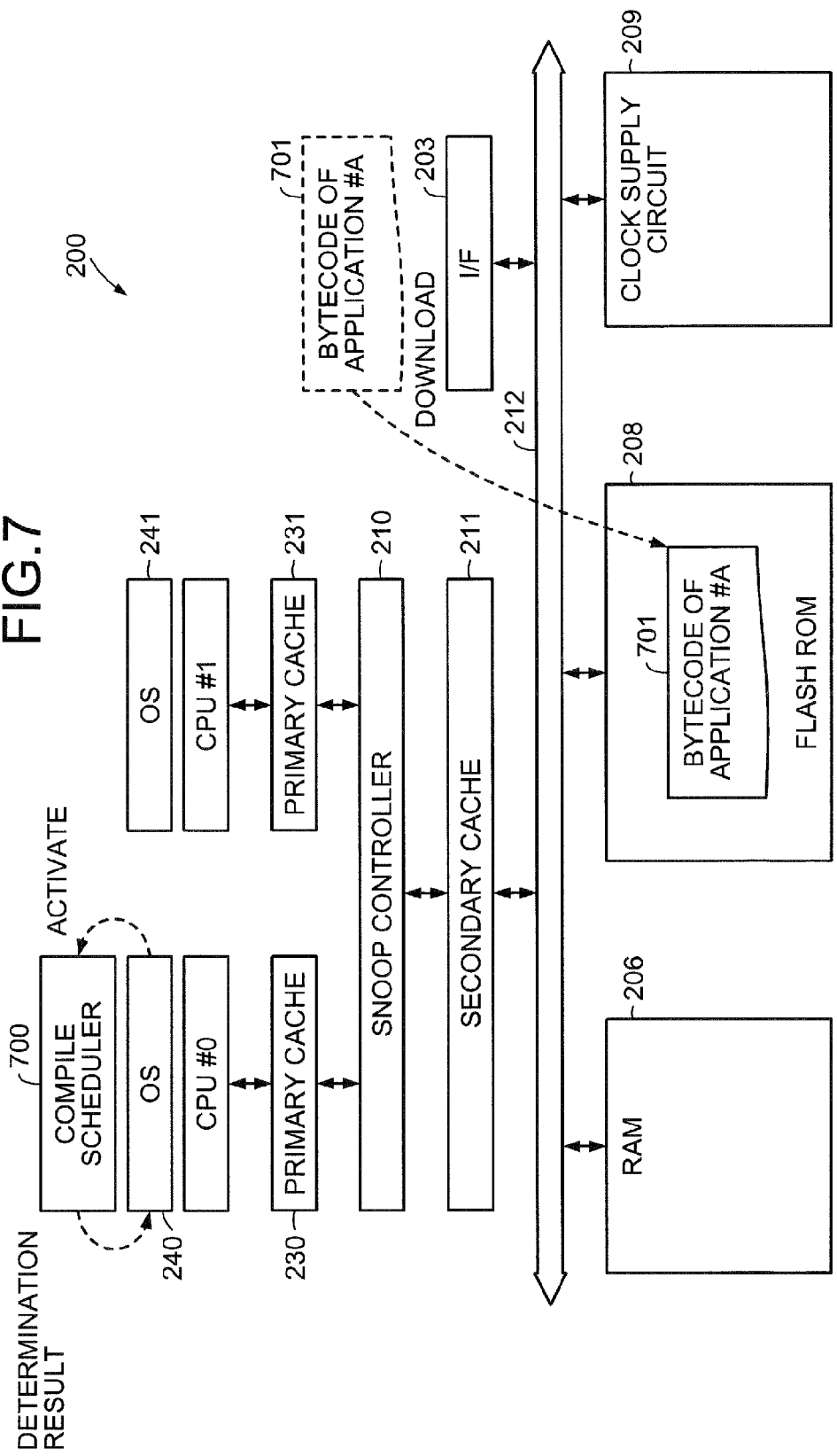
FIG. 7 is an explanatory view of download of an application #A.

FIG. 7 is an explanatory view of download of an application #A. The OS 240 downloads the application #A via the I/F 203. In this case, the bytecode of the application #A, the execution time (T) of the application #A in the bytecode, and the code amount (Code) of the bytecode of the application #A are downloaded. The OS 240 activates a compile scheduler 700. The compile scheduler 700 has a function of converting the bytecode of the application into the native code described in a machine language that can be interpreted by the CPU#0 and the CPU #1. The compile scheduler 700 acquires the execution time (T) of the application #A and the code amount (Code) of the application #A downloaded. For example, it is assumed that T, Code, K, and C are as follows.

T=500 [ms]
Code=160 bytes
k=0.5
C=10

The compile scheduler 700 calculates the conversion time (Tc) from a bytecode 701 of the application #A into the native code of the application #A based on Equation (1) and calculates the execution time (Tn) in the native code after the conversion based on Equation (2).

Tc=0.5×160+10=90 [ms]
Tn=500 [ms]−90 [ms]=410 [ms]

The compile scheduler 700 acquires P, Pc, and Pn from the power consumption table 500 and makes a determination concerning Expression (3). As described above, Pc is 100 [mW]; Pn is 25 [mW]; and P is 50 [mW].

Left side of Expression (3)=100 [mW]×90 [ms]+25 [mW]×41 [ms]=19250
Right side of Expression (3)=50 [mW]×410 [ms]=20500

Since the left side of Expression (3) is less than the right side of Expression (3), Expression (3) is satisfied. Therefore, the compile scheduler 700 determines that the bytecode 701 of the application #A is to be converted into the native code of the application #A. The compile scheduler 700 notifies the OS 240 of the determination result.

FIG. 8 is an explanatory view of a registration example of the conversion management table 600. Upon receiving the determination result, the OS 240 registers the identification information of the application #A into the application identification information field 601 of the conversion management table 600 and registers NOT COMPLETED into the conversion state field 602.

Figure 9:
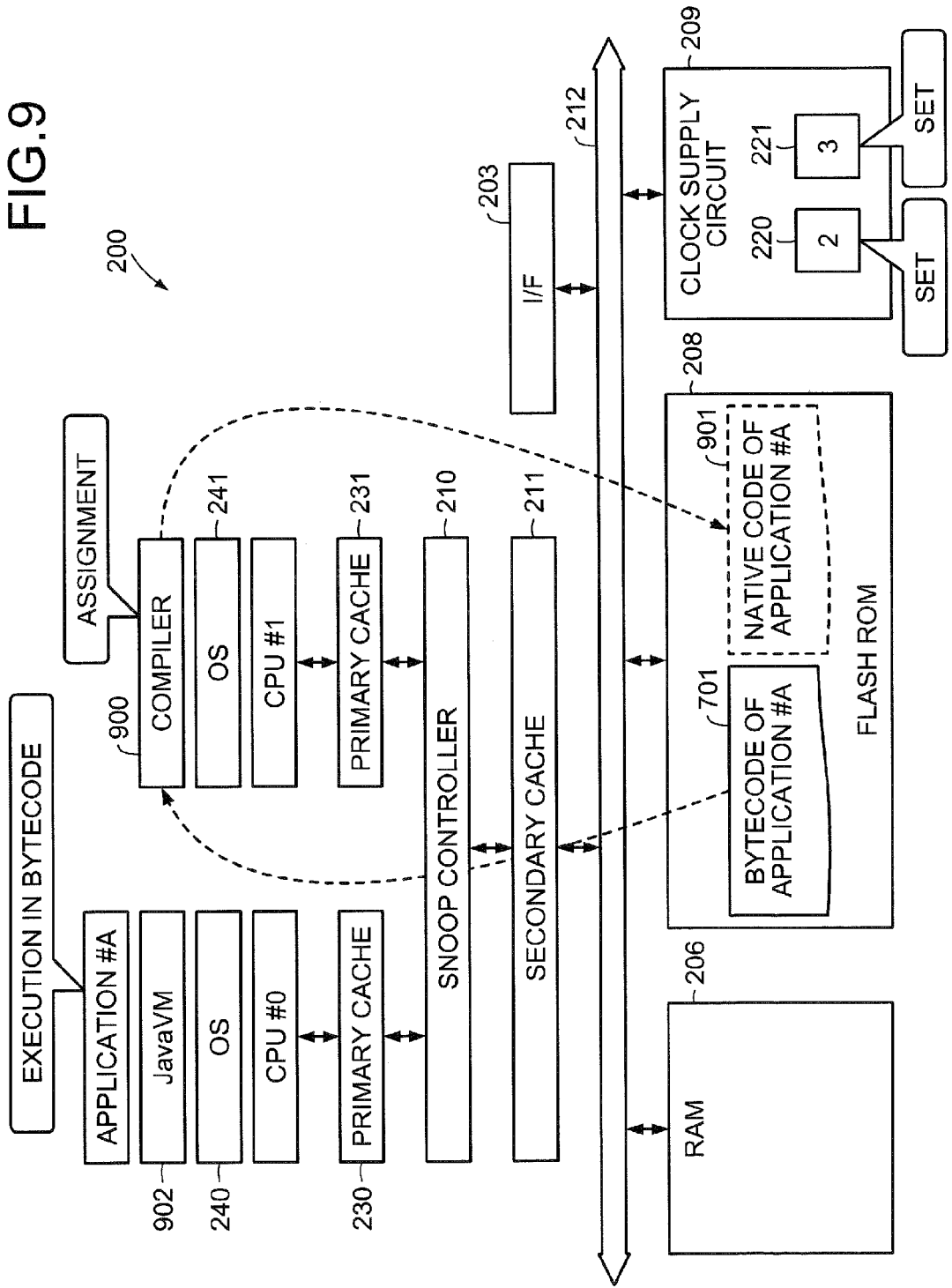
FIG. 9 is an explanatory view of a conversion example.

FIG. 9 is an explanatory view of a conversion example. The OS 240 assigns a compiler 900 to the CPU #1. Upon receiving the assignment of the compiler 900, the OS 241 sets the register 221 of the clock supply circuit 209 to three, thereby providing control such that the frequency of the clock supplied to the CPU #1 is set to Cc=300 [MHz]. The OS 241 executes the compiler 900 and the compiler 900 converts the bytecode 701 of the application #A into a native code 901 of the application #A.

The OS 240 assigns a Java VM 902 to the CPU #0 and sets the register 220 of the clock supply circuit 209 to two, thereby providing control such that the frequency of the clock supplied to the CPU #0 is set to Cb=200 [MHz]. The OS 240 executes the application #A on the Java VM 902 in the bytecode 701 of the application #A.

FIG. 10 is an explanatory view of an update example of the assignment management table 400 according to the assignment of the compiler 900 and the application #A. "Java VM: application #A" is registered into the application identification information field 402 corresponding to the CPU #0 indicated in the CPU identification information field 401 of the assignment management table 400. "Java VM: application #A" indicates that the application #A is executed by the Java VM 902. The compiler 900 is registered into the application identification information field 402 corresponding to the CPU #1 indicated in the CPU identification information field 401 of the assignment management table 400.

Figure 11:
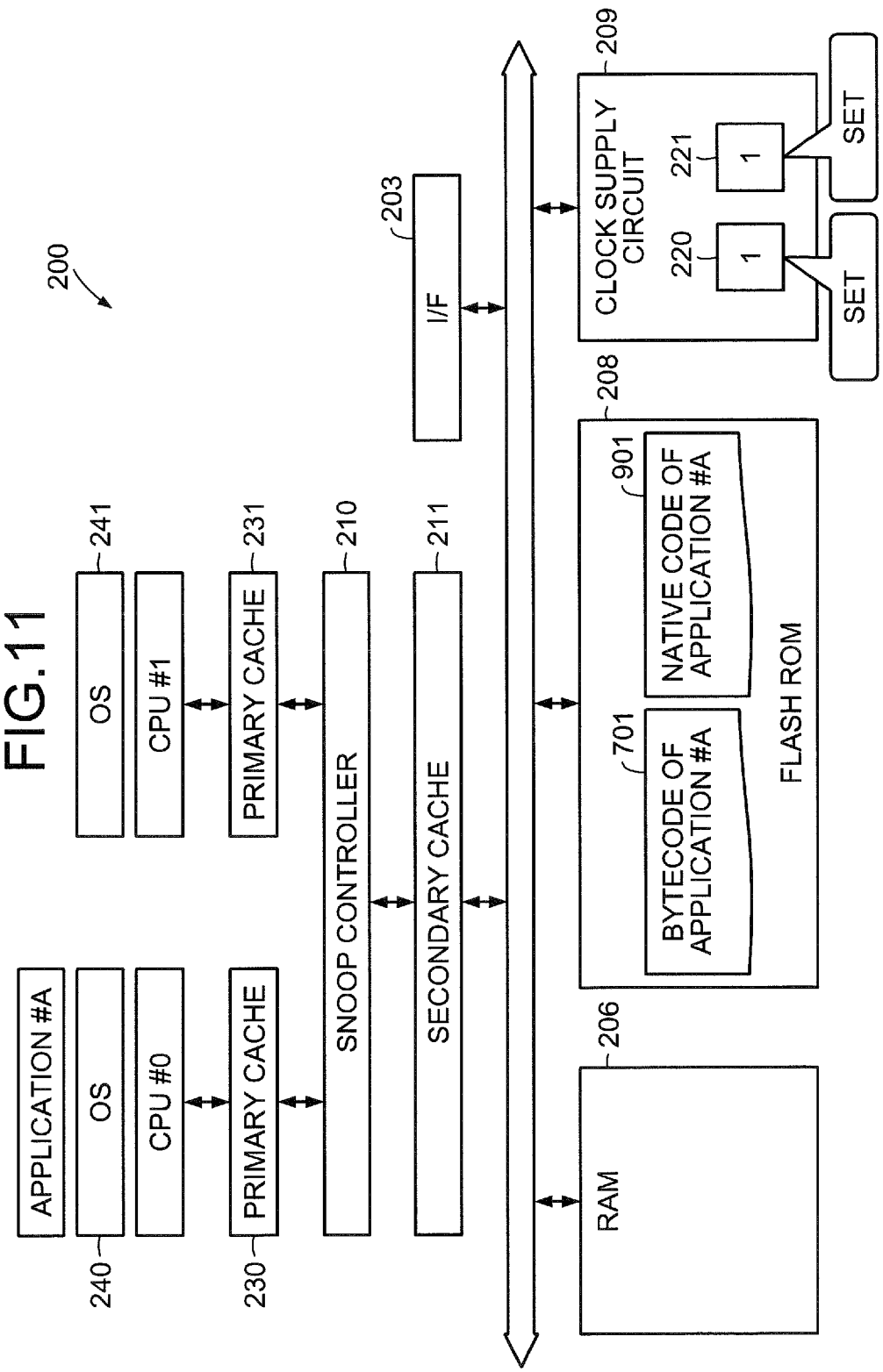
FIG. 11 is an explanatory view of a compiling completion example.

FIG. 11 is an explanatory view of a compiling completion example. The conversion from the bytecode 701 of the application #A into the native code 901 of the application #A is completed. The compiler 900 registers the completion into the conversion state field 602 corresponding to the application #A indicated in the application identification information field 601 of the conversion management table 600. The compiler 900 is terminated.

FIG. 12 is an explanatory view of an update example of the conversion management table 600 after completion of the conversion. COMPLETION is registered into the conversion state field 602 corresponding to the application #A indicated in the application identification information field 601 in the conversion management table 600.

Reference of the description returns to FIG. 11. When the compiler 900 is terminated and if no other thread of an application is assigned to the CPU #1, the OS 241 sets the value of the register 221 of the clock supply circuit 209 to one. As a result, the frequency of the clock supplied to the CPU #1 is set to 100 [MHz]. The OS 241 deletes the compiler 900 from the application identification information field 402 corresponding to the CPU #1 indicated in the CPU identification information field 401 of the assignment management table 400.

Upon receiving notification of the completion of the conversion from the bytecode 701 of the application #A into the native code 901 of the application #A, the OS 240 terminates the Java VM 902. The OS 240 sets the value of the register 220 of the clock supply circuit 209 to one. As a result, the frequency of the clock supplied to the CPU #0 is set to 100 [MHz]. The OS 240 executes the application #A in the native code 901 of the application #A. The OS 240 deletes "Java VM: application #A" from the application identification information field 402 corresponding to the CPU #0 indicated in the CPU identification information field 401 of the assignment management table 400 and registers the application #A.

FIG. 13 is an explanatory view of an update example of the assignment management table 400 after completion of the conversion. In the assignment management table 400, the compiler 900 is deleted from the application identification information field 402 corresponding to the CPU #1 indicated in the CPU identification information field 401. In the assignment management table 400, the application #A is registered in the application identification information field 402 corresponding to the CPU #0 in the CPU identification information field 401.

Figure 14:
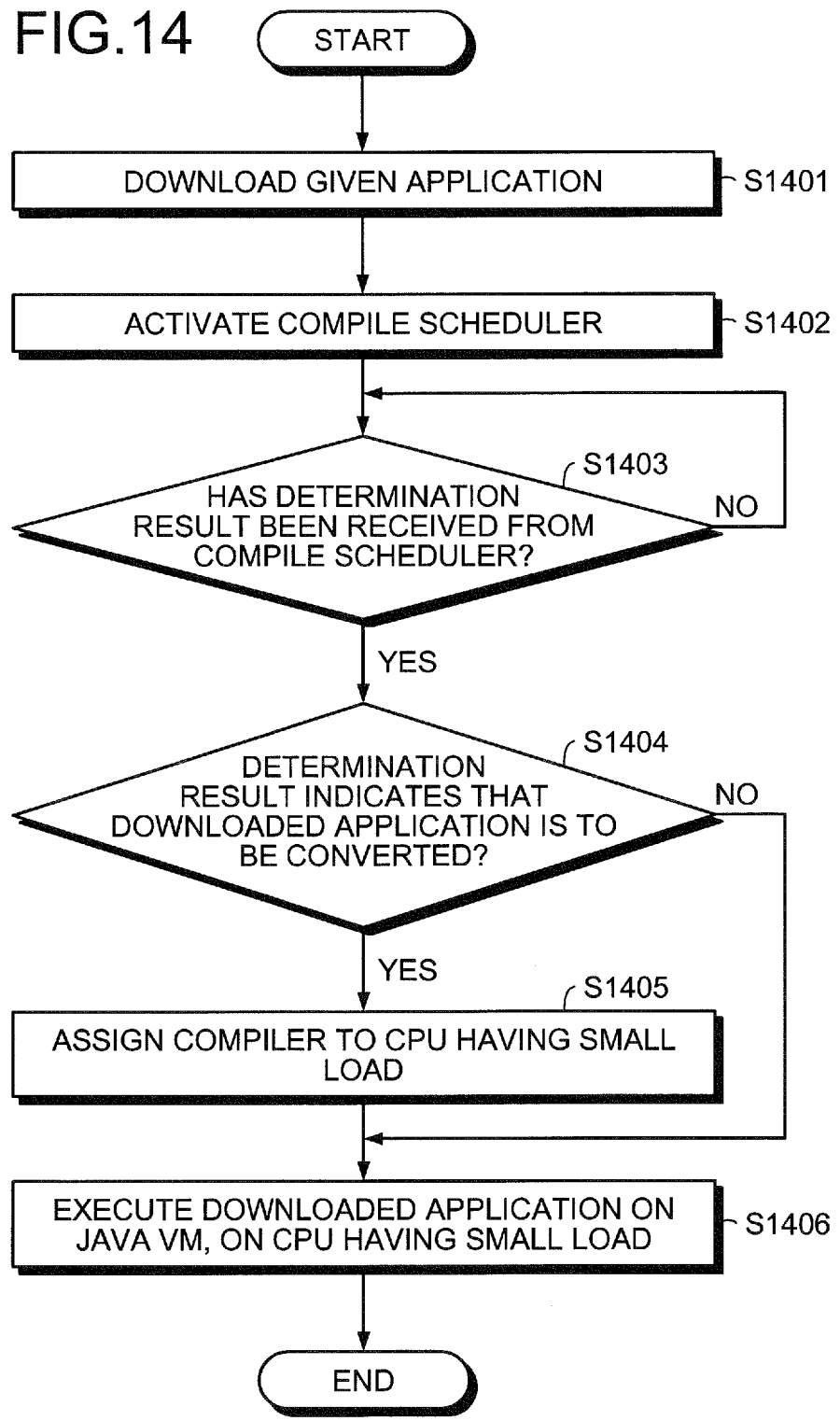
FIG. 14 is a flowchart of an example of a conversion control process procedure by an OS at the time of download.

FIG. 14 is a flowchart of an example of a conversion control process procedure by an OS at the time of download. The download may be performed by any OS. When downloading a given application (step S1401), the OS activates the compile scheduler 700 (step S1402). The OS determines whether a determination result has been received from the compile scheduler 700 (step S1403).

If the OS determines that a determination result has not been received from the compile scheduler 700 (step S1403: NO), the OS returns to step S1403. If the OS determines that a determination result has been received from the compile scheduler 700 (step S1403: YES), the OS determines whether the determination result indicates that the downloaded application is to be converted (step S1404).

If the determination result indicates that the downloaded application is to be converted (step S1404: YES), the OS assigns the compiler 900 to a CPU having a relatively small load (step S1405) and goes to step S1406. If the determination result indicates that the downloaded application is not to be converted at step S1404 (step S1404: NO), the OS goes to step S1406. The OS executes the downloaded application on the Java VM, on a CPU having a relatively small load (step S1406), and terminates the series of operations.

Figure 15:
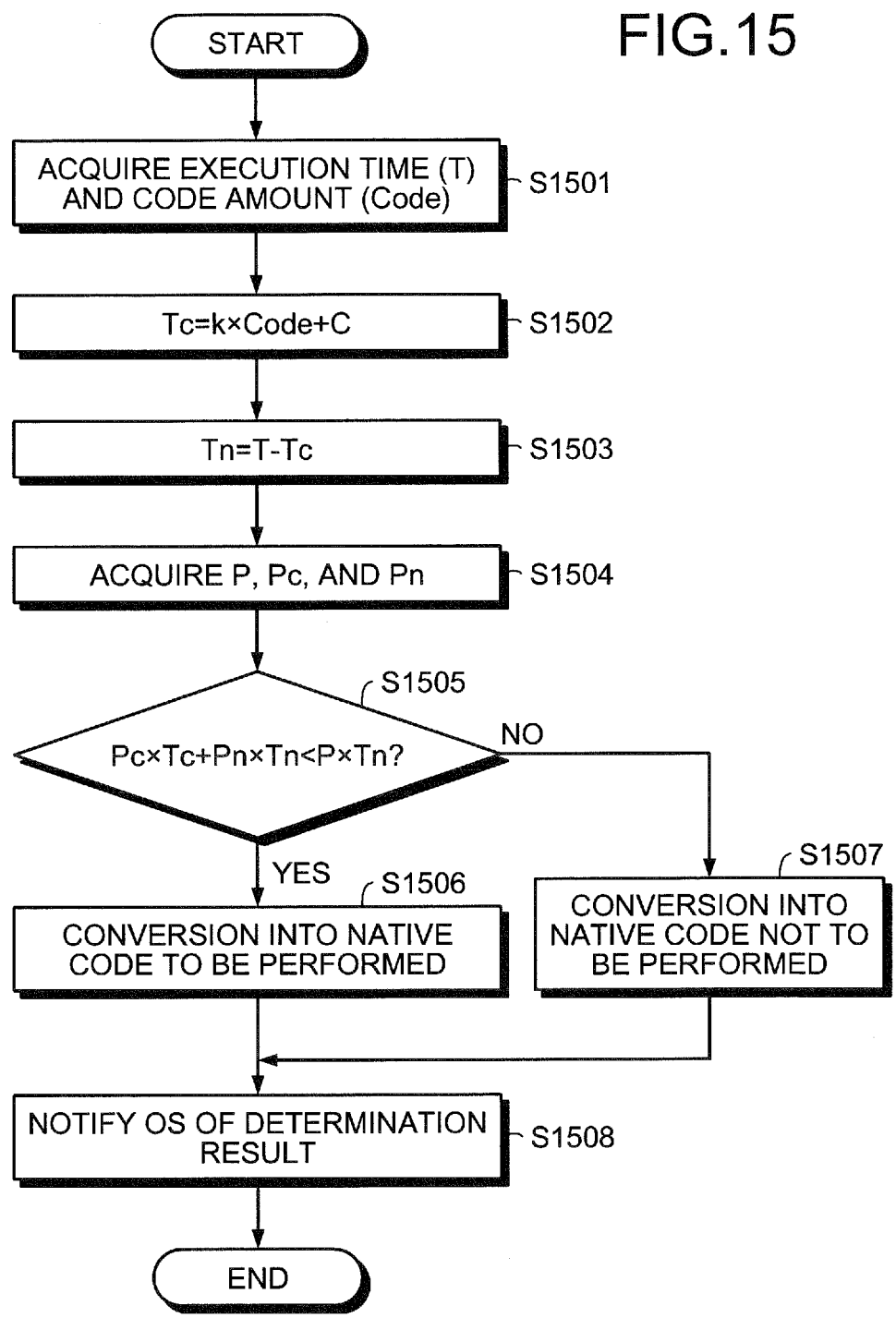
FIG. 15 is a flowchart of an example of a conversion control process procedure by a compile scheduler 700 according to the first example.

FIG. 15 is a flowchart of an example of a conversion control process procedure by the compile scheduler 700 according to the first example. The compile scheduler 700 acquires the execution time (T) and the code amount (Code) of the given application (step S1501), calculates $Tc=k\times Code+C$ (step S1502), and calculates $Tn=T-Tc$ (step S1503). The compile scheduler 700 acquires P, Pc, and Pn (step S1504) and determines whether $Pc\times Tc+Pn\times Tn<P\times Tn$ is satisfied (step S1505).

If the compile scheduler 700 determines that $Pc\times Tc+Pn\times Tn<P\times Tn$ is satisfied (step S1505: YES), the compile scheduler 700 determines that the conversion into the native code is to be performed (step S1506). If the compile scheduler 700 determines that $Pc\times Tc+Pn\times Tn<P\times Tn$ is not satisfied (step S1505: NO), the compile scheduler 700 determines that the conversion into the native code is not to be performed (step S1507). After step S1506 or step S1507, the compile scheduler 700 notifies the OS of the determination result (step S1508), and terminates the series of operations.

Figure 16:
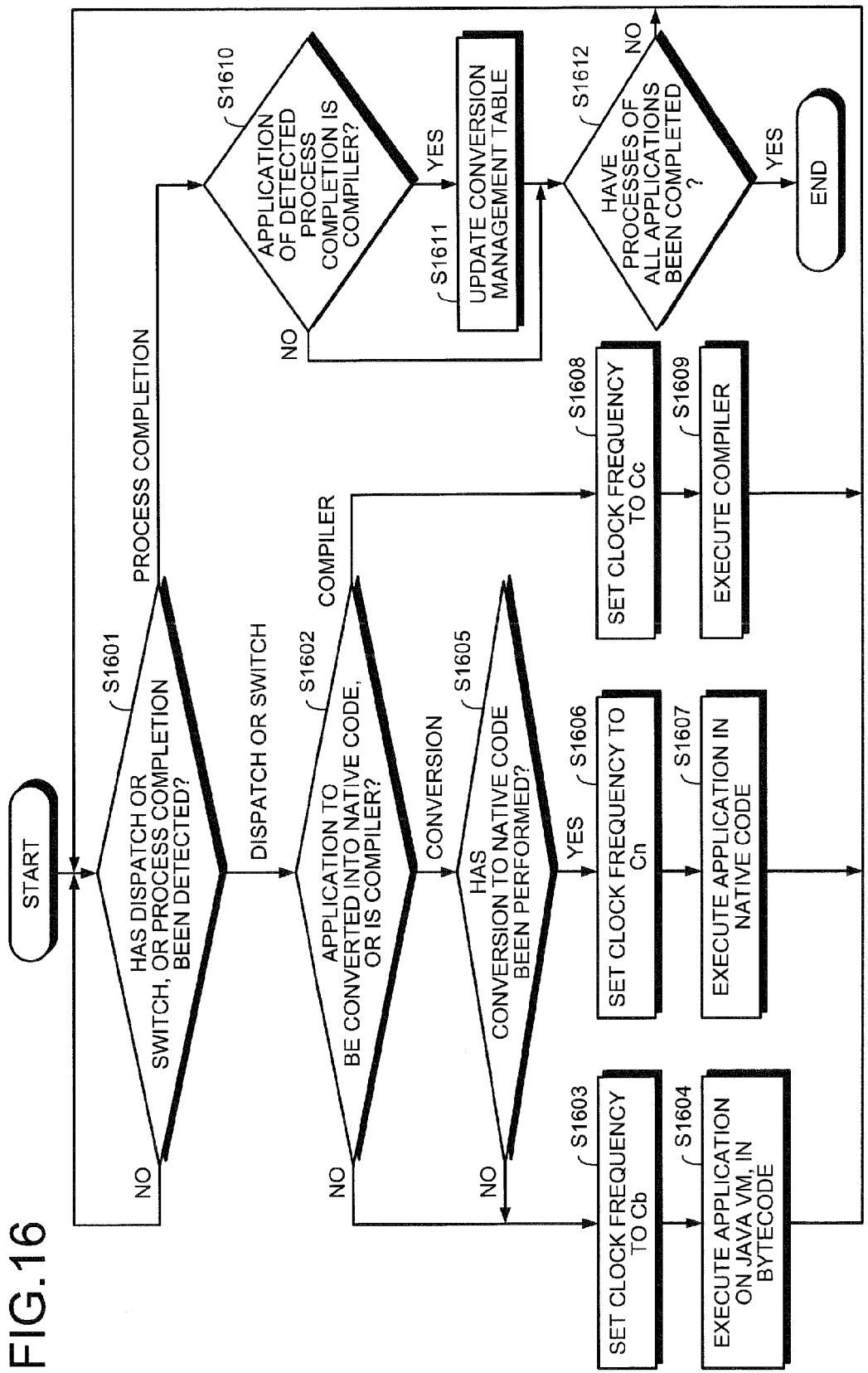
FIG. 16 is a flowchart of a program execution process procedure by each OS.

FIG. 16 is a flowchart of a program execution process procedure by each OS. The OS determines whether dispatch or switch, or process completion has been detected (step S1601). If the OS determines that neither dispatch, switch, nor process completion has been detected (step S1601: NO), the OS returns to step S1601.

If the OS determines that dispatch or switch has been detected (step S1601: DISPATCH OR SWITCH), the OS goes to step S1602. The OS determines whether a dispatched/switched application is an application to be converted into the native code or is the compiler 900 (step S1602). If the OS determines that the dispatched/switched application is not an application to be converted into the native code and is not the compiler 900 (step S1602: NO), the OS sets the clock frequency to Cb (step S1603). The OS executes the application on the Java VM, in the bytecode (step S1604), and returns to step S1601.

If the OS determines that the dispatched/switched application is an application to be converted into the native code (step S1602: CONVERT), the OS determines whether the conversion to the native code has been performed (step S1605). If the OS determines that the conversion to the native code has not been performed (step S1605: NO), the OS goes to step S1603. If the OS determines that the conversion to the native code has been performed (step S1605: YES), the OS sets the clock frequency to Cn (step S1606), executes the application in the native code (step S1607), and returns to step S1601.

If the OS determines that the dispatched/switched application is the compiler 900 (step S1602: COMPILER), the OS sets the clock frequency to Cc (step S1608). The OS executes the compiler 900 (step S1609), and returns to step S1601.

If the OS determines that the process completion has been detected (step S1601: PROCESS COMPLETION), the OS determines whether the application of the detected process completion is the compiler 900 (step S1610). If the OS determines that the application of the detected process completion is the compiler 900 (step S1610: YES), the OS updates the conversion management table 600 (step S1611) and determines whether the processes of all the applications have been completed (step S1612).

If the OS determines that the processes of all the applications have not been completed (step S1612: NO), the OS returns to step S1601. If the OS determines that the processes of all the applications have been completed (step S1612: YES), the OS terminates the series of operations. If the OS determines that the application of the detected process completion is not the compiler 900 at step S1610 (step S1610: NO), the OS goes to step S1612.

Figure 17:
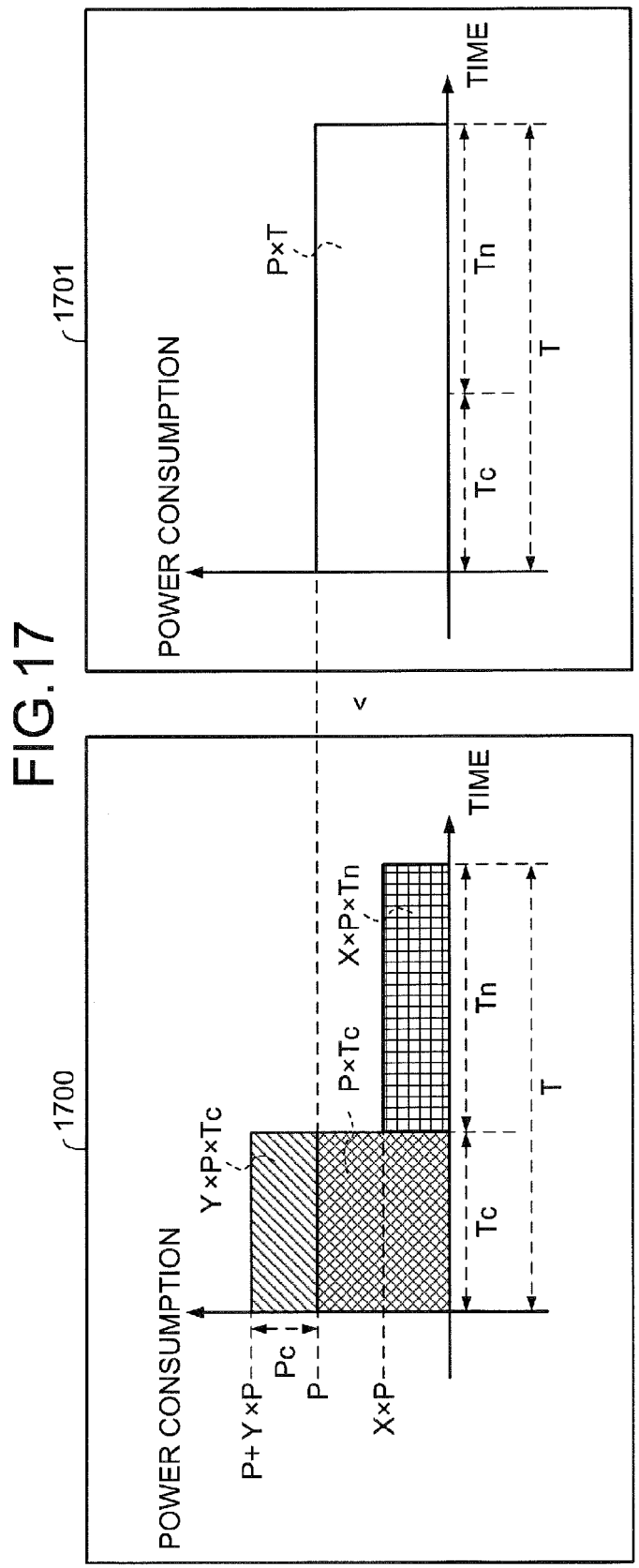
FIG. 17 is an explanatory view of a determination example according to a second example.

FIG. 17 is an explanatory view of a determination example according to the second example. In the second example, Pc is defined as Y×P and Pn is defined as X×P. In other words, X is a proportion of a value of power consumption per unit time for execution in the native code to a value of power consumption per unit time during execution in the bytecode. Y is a proportion of a value of power consumption per unit time for execution of the compiler 900 to a value of power consumption per unit time for execution in the bytecode.

A graph 1700 represents power consumption when the application is executed in the bytecode while the bytecode is being converted into the native code and the application is executed in the native code after completion of the conversion. A graph 1701 represents power consumption when the application is executed in the bytecode. FIG. 17 can be expressed by Equation (4):

$$P \times Tc + Y \times P \times Tc + X \times P \times Tn < P \times T \quad (4)$$

Tc and Tn can be calculated from Equations (1) and (2), respectively. Equation (4) is generalized with P into Expression (5):

$$(1+Y) \times Tc + X \times Tn < T \quad (5)$$

If Expression (5) is satisfied, the compile scheduler 700 determines that the bytecode is converted into the native code. If Expression (5) is not satisfied, the compile scheduler 700 determines that the bytecode is not converted into the native code.

In the second example, as is the case with the first example, when the application #A is downloaded, it is determined whether the bytecode 701 of the application #A is to be converted into the native code 901 of the application #A, based on whether Equation (4) or Expression (5) described above is satisfied, instead of Expression (3). Since the processes of the OS 240 and the OS 241 in the second example are the same as the processes described in the first example, only the process of the compiler 700 will be described in detail. It is assumed that X and Y are stored in advance in a power consumption table.

FIG. 18 is an explanatory view of an example of a power consumption table used in the second example. A power consumption table 1800 has an execution field 1801, a clock frequency field 1802, and a proportion field 1803. The execution field 1801 indicates execution in the native code, execution in the bytecode, and execution of a compiler. The clock frequency field 1802 indicates the frequency of the clock supplied to a CPU during the execution indicated in the execution field 1801.

In the power consumption table 1800, the frequency (Cc) of the clock supplied to a CPU during execution of the compiler 900 is 300 [MHz] and the frequency (Cn) of the clock supplied to a CPU during execution in the native code is 100 [MHz]. In the power consumption table 1800, the frequency (Cb) of the clock supplied to a CPU during execution in the bytecode is 200 [MHz]. Cn<Cb<Cc is satisfied.

The proportion field 1803 indicates the proportion of power consumption per unit time for the execution indicated in the execution field 1801 to the power consumption per unit time for execution in the bytecode. Since Pc (Y×P) is 100 [mW]; Pn (X×P) is 25 [mW]; and P is 50 [mW], X (0<X<1) is ½ and Y (1<Y) is 2 in the power consumption table 1800. The power consumption table 1800 is assumed to be stored in a storage device such as the RAM 206, the primary cache 230 and the primary cache 231, and the secondary cache 211.

As is the case with the first example, Tc and Tn are as follows:
Tc=90 [ms]
Tn=410 [ms]

The compile scheduler 700 acquires X and Y from the power consumption table 1800 and makes a determination regarding Expression (5).

$$\text{Left side of Expression (5)} = (1 + 2) \times 90[\text{ms}] + (1/2) \times 410[\text{ms}]$$
$$= 270 + 205$$
$$= 475$$

$$\text{Right side of Expression (5)} = 500[\text{ms}]$$

Since the left side of Expression (5) is less than the right side of Expression (5), Expression (5) is satisfied. Therefore, the compile scheduler 700 determines that the bytecode 701 of the application #A is to be converted into the native code 901 of the application #A. The processes after the OS has received the determination result are identical to those in the first example and thus, detailed description thereof is omitted hereinafter.

A program execution process procedure by an OS and a program conversion control process procedure by the compile scheduler 700 will be described. The program execution process procedure by an OS according to the second example is the same as the program execution process procedure by an OS described in the first example and therefore will not be described in detail.

Figure 19:
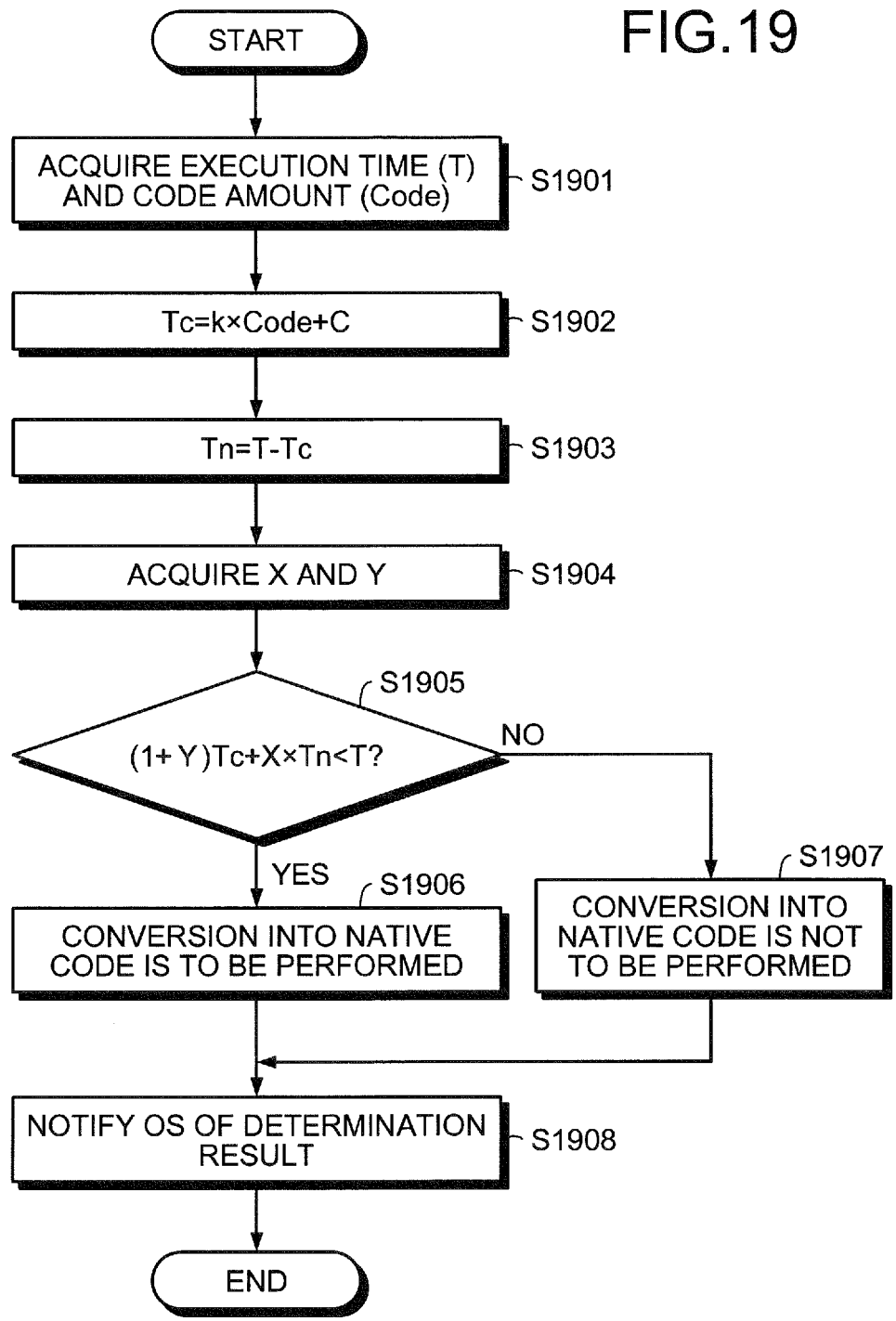
FIG. 19 is a flowchart of an example of a conversion control process procedure by the compile scheduler 700 according to the second example.

FIG. 19 is a flowchart of an example of a conversion control process procedure by the compile scheduler 700 according to the second example. The compile scheduler 700 acquires the execution time (T) of a given application and the code amount (Code) of the bytecode of the given application (step S1901), calculates Tc=k×Code+C (step S1902), and calculates Tn=T−Tc (step S1903). The compile scheduler 700 acquires X and Y (step S1904) and determines whether (1+Y)Tc+X×Tn<T is satisfied (step S1905).

If the compile scheduler 700 determines that (1+Y)Tc+X×Tn<T is satisfied (step S1905: YES), the compile scheduler 700 determines that the conversion into the native code is to be performed (step S1906). If the compile scheduler 700 determines that (1+Y)Tc+X×Tn<T is not satisfied (step S1905: NO), the compile scheduler 700 determines that the conversion into the native code is not to be performed (step S1907). After step S1906 or step S1907, the compile scheduler 700 notifies the OS of the determination result (step S1908) and terminates the series of operations.

As described above, according to the program executing method, whether the bytecode of a given application is to be converted into the native code to execute the given application is determined based on the value of power consumption for execution in each code. As a result, the power consumption can be suppressed and, if the given application is converted into the native code for execution, the application can be executed in a code suitable for the performance of each terminal.

If the value of power consumption for execution in the bytecode is less than the value of power consumption for execution in the native code, the bytecode of the given application is not converted into the native code and the given application is executed in the bytecode. As a result, power consumption can be suppressed.

The value of power consumption for execution in the native code is calculated based on the execution time of the given application, the conversion time from the bytecode into the native code, and the CPU performance. Thus, changes in the value of power consumption for execution in the native code consequent to variations in the value of power consumption per unit time depending on the performance of each CPU can be represented, and the application can be executed in code suitable for the performance of each terminal.

The conversion time is calculated based on the code amount of the bytecode. Thus, increases in value of power consumption for execution in the native code, resulting from a longer conversion time of the compiler when a code amount is increased can be represented. Therefore, the accuracy of the value of power consumption for execution in the native code, calculated before the execution, is increased.

The conversion time is calculated based on CPU properties. The conversion by the compiler may require time and lead to a longer conversion time depending on the properties of the CPU. Therefore, variations in the conversion time dependent on the terminal are represented and the accuracy of the value of power consumption for execution in the native code, calculated before the execution, is increased. Since the conversion time is varies depending on the terminal, whether the conversion is to be performed depends on the performance of the terminal, whereby an application can be executed in a code suitable for performance of the terminal.

The frequency of the clock supplied to a CPU during conversion from the byte code into the native code is set higher than the frequency of the clock supplied to a CPU during execution in the bytecode. Although the power consumption is increased when the conversion is performed at the same time with the execution in the bytecode, since the clock frequency during the conversion is set higher, the conversion time can be shortened and the power consumption can be reduced.

The frequency of the clock supplied to a CPU during execution in the native code is set lower than the frequency of the clock supplied to a CPU during execution in the bytecode. Since the execution in the native code has a smaller processing amount as compared to the execution in the bytecode, even if the frequency of the clock is lowered during execution in the native code, the operation required during execution in the bytecode can be satisfied. Therefore, by setting the clock frequency to be lower during execution in the native code, power consumption can be suppressed.

By determining whether the conversion from the bytecode into the native code is to be performed, the compile scheduler can prevent increases in load in the execution of the OS.

The application is executed in the bytecode during the conversion from the bytecode into the native code. Since the application is executed in the native code after completion of the conversion, response to a user can be improved when the application is executed immediately after download.

The program executing method can be implemented by executing a preliminarily prepared program on a CPU of the multicore processor. For example, the program is included in the OS 240, the OS 241, and the compile scheduler 700 of the first and second embodiments. The program may be recorded on a recording medium such as the flash ROM 205 readable by a CPU of the multicore processor and may be read from the recording medium and executed by a CPU of the multicore processor. The program may be distributed via a network such as the Internet.

According to one aspect of the embodiment, applications are executed in code suitable for the performance of each terminal while power consumption is suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A program executing method executed by a computer, the program executing method comprising:
   calculating a first power consumption for execution of a first program described by a first code;
   calculating a second power consumption for (a) execution of the first program while converting the first program into a second program of a function identical to that of the first program and described by a second code, and (b) execution of the second program performed after completion of conversion; and
   converting the first program into the second program and executing the second program, if the second power consumption is less than the first power consumption.

2. The program executing method according to 1, further comprising
   executing the first program, if the second power consumption is greater than the first power consumption.

3. The program executing method according to 1, wherein
   the calculating of the second power consumption includes calculating based on an execution time of the first program, a conversion time for converting the first program into the second program, and a property of a CPU that is included in the computer.

4. The program executing method according to 3, further comprising
   calculating the conversion time based on a first code amount of the first program.

5. The program executing method according to 4, wherein
   the calculating of the conversion time includes calculating the conversion time based on the property of the CPU included in the computer.

6. The program executing method according to 1, further comprising
setting, to a frequency higher than a frequency of a first clock for execution of the first program, a frequency of a second clock for conversion of the first program into the second program.

7. The program executing method according to 1, further comprising
setting, to a frequency lower than a frequency of a first clock for execution of the first program, a frequency of a third clock for execution of the second program.

8. The program executing method according to 1, further comprising
activating a compile scheduler; and
determining, via the compile scheduler, whether the first program is to be converted into the second program.

9. The program executing method according to 1, further comprising
executing the first program while the first program is being converted into the second program, wherein
the converting of the first program into the second program and the executing of the second program includes executing the second program after completion of the converting.

* * * * *